United States Patent [19]

Hinson et al.

[11] Patent Number: 4,665,433
[45] Date of Patent: May 12, 1987

[54] VIDEO SIGNAL PROCESSING WITH FILTERING TO ACCOUNT FOR PICTURE COMPRESSION

[75] Inventors: Neil R. Hinson; Stephen P. Greenhalgh, both of Newbury, United Kingdom

[73] Assignee: Quantel Limited, Kenley, Great Britain

[21] Appl. No.: 715,508

[22] Filed: Mar. 25, 1985

[30] Foreign Application Priority Data

Apr. 25, 1984 [GB] United Kingdom ................ 8410597

[51] Int. Cl.[4] ........................ H04N 9/74; H04N 5/262
[52] U.S. Cl. ..................................... 358/22; 358/160; 358/183
[58] Field of Search .................. 358/22, 182, 183, 160

[56] References Cited

U.S. PATENT DOCUMENTS

| 4,152,719 | 5/1979 | Kellar | 358/22 |
| 4,163,249 | 7/1979 | Michael et al. | 358/21 R |
| 4,266,242 | 5/1981 | McCoy | 358/22 |
| 4,282,546 | 8/1981 | Reitmeier | 358/22 |

Primary Examiner—John W. Shepperd

[57] ABSTRACT

A video signal processing system which produces the same output image as the input image but with a size and/or shape change applied to it. The incoming video signals are written into the frame store in sequence but read out in an order determined by the output image required. When compressions in the image occurs the luminance signals are filtered prior to writing in the store.

19 Claims, 4 Drawing Figures ically, by a combination of the compression fac-
VIDEO SIGNAL PROCESSING WITH FILTERING TO ACCOUNT FOR PICTURE COMPRESSION

BACKGROUND TO THE INVENTION

This invention relates to video signal processing systems, especially systems for manipulating television signals in digital form to produce effects such as changes in magnification, shape, orientation or position of the image or part thereof.

In one form of such a system, as described in U.K. Patent Application No. 8108467, which corresponds to U.S. Pat. No. 4,437,121, incoming video signals, after conversion to digital form, are written in a frame store in input raster format, so that successive pixels of the digitized signals are assigned to successive storage locations in the store. They are then read from the storage locations in a different sequence, and this sequence is pre-determined to produce the desired effect when the signals are reproduced. The operation is illustrated in FIG. 1 of the accompanying drawings in which the small circles represent a patch of storage locations in the frame store in which are stored, during the writing operation, the digital signals representing a group of successive pixels in each of a group of successive lines in a field of the input raster. Four adjacent storage locations are denoted as having addresses $x_n, y_n; x_{n+1}, y_n;$ $x_n, y_{n+1}$ and $x_{n+1}, y_{n+1}$ respectively, x and y being the along-line and across-line co-ordinates relative to the input raster. In the same figure the small crosses represent the addresses from which a few successive pixels should be read in line 1 of the output signals. Such addresses are selected according to the effect which is desired, and in general the addresses of the pixels in the output signal raster will not coincide with the storage locations in the frame store. Therefore the pixels used to build up the output signals are synthesized by interpolating among the pixels written in the storage locations adjacent the addresses of the output pixels. For example, the output pixel having the address denoted as $x_k, y_k$ in FIG. 1 would be synthesized by interpolating among the input pixels written at the addresses $x_n, y_n;$ $x_{n+1}, y_n; x_n, y_{n+1}$ and $x_{n+1}, y_{n+1}$. Each address such as $x_k, y_k$ is derived by transforming the address co-ordinates of the pixel in the output signal raster (say $x_k, y_k$) into the coordinates related to the input signal raster. Consideration of FIG. 1 will indicate that (assuming the line 1 is representative of the output signal raster) the output signals, when read from the frame store will represent the same image as the input signals, but the image would be compressed and rotated compared with the image represented by the input signals.

A system such as described in the preceding paragraph is a flexible means of achieving production effects. A disadvantage is however encountered occasionally when image compression is effected. Reference to FIG. 1 will show that as the compression factor increases to and beyond 2 (magnification equal to ½) the output signals will be unable to resolve detail of short wavelength, of the order to 2 pixel dimensions, in the output raster, and the interpolation used to synthesize the pixels to build up the output signals tends to produce noticeable disturbances in the image.

OBJECT OF THE INVENTION

The object of the present invention is to provide an improved video signal processing system in which this disadvantage is reduced.

SUMMARY OF THE INVENTION

According to the present invention there is provided a video signal processing system comprising;

storage means, means for writing pixels of the input video signals in respective addresses of said storage means and, means for reading pixels from said storage means in a different sequence to produce output video signals representing the same image as the input video signals but with at least a change in magnification, and wherein means are provided responsive to compression of the image represented by the output video signals relative to that represented by the input video signals to filter the video signals prior to reading from said storage means to a degree dependent upon the compression. Preferably the filtering is carried out prior to writing the input video signals in said storage means. Preferably said filter means is able to respond to changes in compression occurring as between one part and another of the image represented by the video signals.

BRIEF DESCRIPTION OF THE DRAWINGS

In order that the present invention may be more clearly understood and readily carried into effect, the same will be more fully described with reference to the accompanying drawings in which.

DETAILED DESCRIPTION OF THE INVENTION

Figure 2:
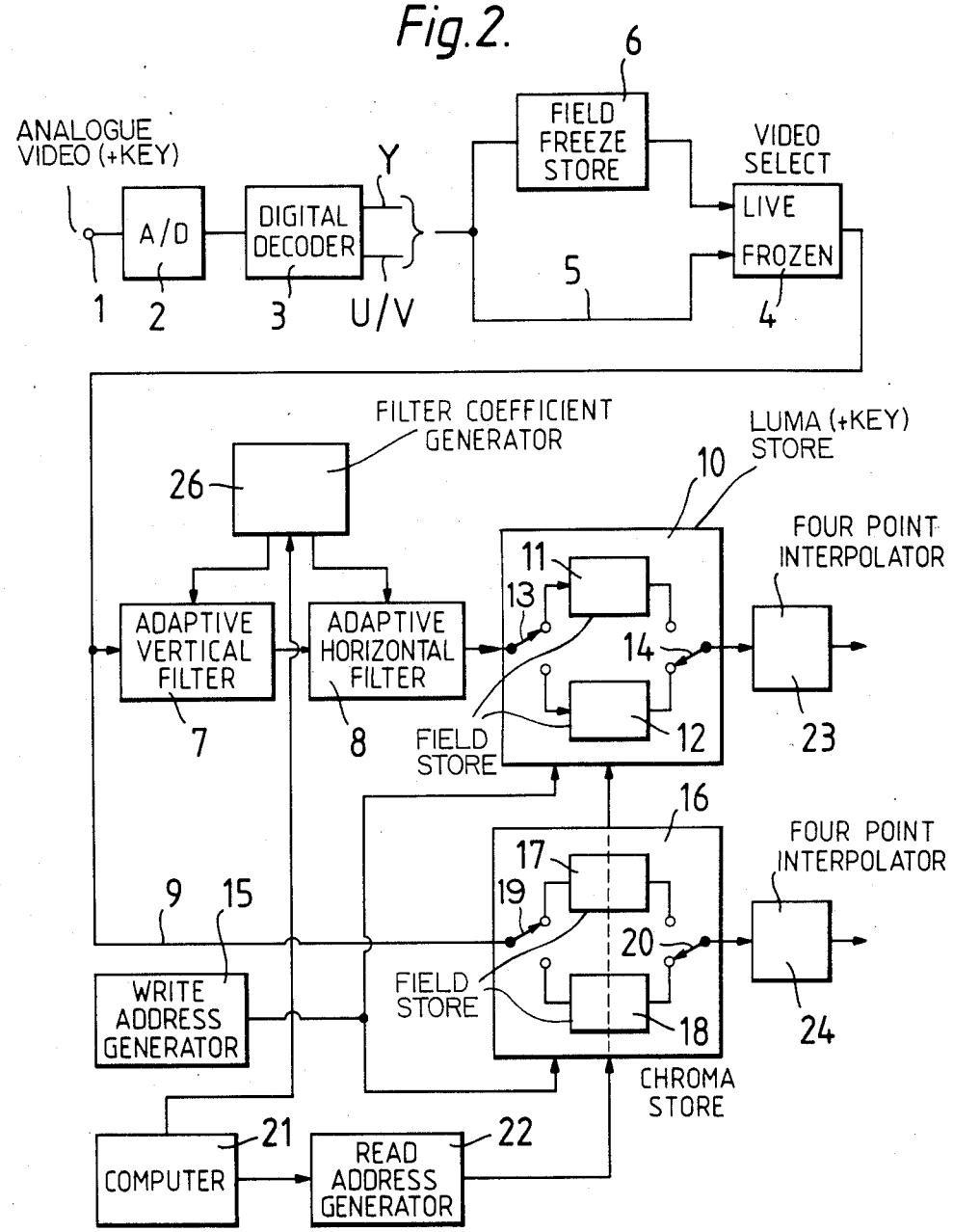
FIG. 2 illustrates, mainly in block form, on example of a system according to the present invention.

Referring to the drawings, reference 1 FIG. 2 denotes the input terminal of the system to which is applied, in operation, input video signals in analog form, representing an image which it is desired to manipulate in order to produce effects such as changes in magnification, shape, orientation or position, or combinations thereof. The signals may be derived from a camera, a video tape recorder or other source of video signals. The signals may, in general, relate to a moving image, the system which is about to be described being capable of operating in real time. The video signals from the terminal 1 are applied to an analog-to-digital converter 2 which converts the signals to a sequence of digital samples. The output signals from the converter 2 are fed to a digital decoder 3 which derives from the digital samples two data streams each of 13.5 MHz. One stream comprises the luminance (Y) pixels of the video signals and the other comprises the two color differences (U and V) pixels each of 6.75 MHz, time multiplexed into one stream. The Y pixels occur in a sequence of lines and fields and the timing of the pixels in relation to the television frame periods indicates the x and y co-ordinates in the image. The U and V pixels are co-sited with every other Y pixel. The digital data streams from the decoder 3 are passed either to a video signal selector 4 via the highway 5, or to a field freeze store 6 in which a field of video signals Y, U and V can be accumulated during one field period. The selector 4 can be controlled by the operator either to transmit directly the digital data streams on the highway 5, or to block these streams, and to transmit repeatedly the last field of data signals accumulated in the field store 6, the input in the field store being blocked when this is taking place. This gives the operator the choice of transmitting either a moving or a still picture. The selector 4 may also have a third function, namely to select streams of video signals representing a border for transmission to following stages, but this function is well known and need not be further described; for simplicity only Y and U/V video streams will be considered in the following description.

The Y pixels from the selector 4 are passed in sequence to two adaptive filters 7 and 8. The filter 7 is arranged to produce a variable degree of so called vertical filtering and the filter 8 produces a variable degree of horizontal filtering. The filtering has the effect of reducing the resolution of the Y signals as will be described subsequently. The U and V pixels are each already of reduced resolution compared with the Y pixels, and so are by passed round the filters via a path 9.

Figure 1:
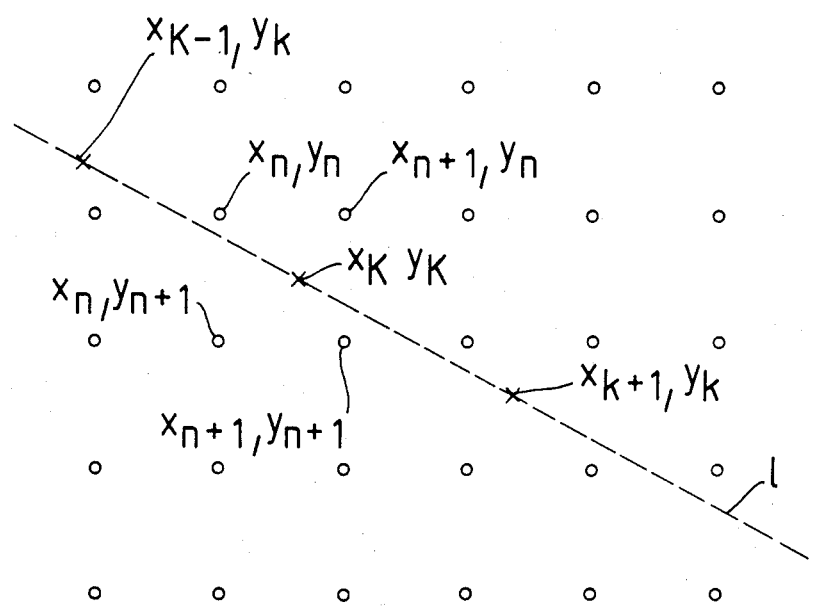
FIG. 1 illustrates an aspect of image manipulation.

The luminance pixels from the filters 7 and 8 are fed to a luminance frame store 10 comprising two field stores 11 and 12 by way of a switch 13. The switch is controlled so that luminance pixels are written in the field stores 11 and 12 alternately during successive field periods. The locations in the field stores at which the luminance pixels are written is controlled by a write address generator 15, which addresses the storage locations in the sequence of the pixels in the input raster, such as represented in FIG. 1. The chrominance pixels U and V from the selector 4 are similarly fed to a chrominance frame store 16 comprising two field stores 17 and 18, by way of switch 19. The write address generator 15 serves the store 16 as well as the store 10, and controls the locations on the field stores 17 and 18 at which the U and V pixels are written. Signals are read from the frame stores 10 and 16 via respective switches 14 and 20, which are operated in anti-phase to the switches 13 and 19 so that reading takes place during successive field periods from that one of the two field stores 12, 13 or 17, 18 in which writing occurred during the proceeding field period. The switches 13, 19 and 14, 20 are controlled in known manner by the sequencer of the system, which is not shown.

The references 21 and 22 denote a computer and a read address generator for the stores 10 and 16. The computer is arranged to generate the transforms for calculating the addresses in the stores 10 and 16 from which should be derived the pixels in the output signal raster. The transforms are updated in the computer at field rate and applied to read address generator 22 during respective field blanking intervals. The read address generator 22 is in turn arranged to generate the addresses for successive pixels in each field in response to the transforms, in the co-ordinate system of the input raster, the addresses of successive pixels in the output raster. For example, during one line of the output raster of the system, the address generator 22 will generate, in succession, and at pixel rate, addresses such as represented by $x_{k-1}$, $y_{k-1}$; $x_k$, $y_k$ and $x_{k+1}$, $y_{k+1}$ in FIG. 1. As indicated these addresses will occur in the same line of the output signal raster. For each address so generated, the read address generator 22 applies read signals to four storage locations in field store 11 or 12 closest to the generated address. For example, if the read address generator generates the address $x_k$, $y_k$ as shown in FIG. 1, the read address generator will apply read signals to the four addresses $x_n$, $y_n$; $x_{n+1}$, $y_n$; $x_n$, $y_{n+1}$ and $x_{n+1}$, $y_{n+1}$.

The generator 22 operates in a similar way in relation to the field stores 17 and 18, except that in this case the read signals are applied to the four nearest storage locations holding U or V pixels, as the situation requires. The four pixels read from the store 10 at any one time, are fed to a four point Y- interpolator 23, and the four pixels read from the store 16 are applied to a four point U- or V- interpolator 24. Each interpolator combines the four pixels read from the stores 10 or 16 in proportions determined by interpolation co-efficients generated by the address generator 22. The interpolation co-efficients are such as to produce for each address, such as $x_k$, $y_k$ a pixel approximating to the value of the luminance or the respective chrominance component of the image at the respective point. The computer 21, the address generator 22 and the four point interpolators 23 and 24 may be of any suitable construction, such for example, as that used in the digital production effects equipment DPE 5000 manufactured by the assignee of this application, or as described in U.K. Patent Application No. 8108467, which corresponds to U.S. Pat. No. 4,437,121, the subject matter of which is herein incorporated by reference. The output signal streams may be re-coded to conform to one or other of the standard color television waveforms, reconverted to analog form, and then transmitted, recorded or processed in desired ways.

The effect on the image produced by the system will depend on the particular co-ordinate transformation carried out by the computer 21 in conjunction with the address generator 22. The image change may be initiated by the operator with the aid of a joystick or other control means causing the computer to generate the required matrix transforms. Alternatively the output addresses for a particular effect may be predetermined in the form of an address map, or a sequence of such maps, and stored for use when requred. As aforesaid, and as illustrated in FIG. 1, one of the effects which can be produced is image compression, which may be produced on its own, or in association with other effects, such as rotation or translation. Moreover, certain effects may result in only part of the image being compressed, or in the compression being variable with position on the image. This is particularly so when the effect of perspective is taken into account in the manipulation of the image.

To reduce the disadvantage referred to above, which may arise when compression occurs, the computer 21 is arranged not only to generate the transforms required for the address generator 22, but also to generate the inverse transforms. These are applied to a filter co-efficient generator 26 which is arranged to generate the address for the pixels of the input video signal transformed to the co-ordinate system related to the output raster. For example, in the representative situation illustrated in FIG. 1, the computer 21 will generate the address of the pixel at $x_n$, $y_n$ in terms of the output co-ordinate system. The address, say $x_r$, $y_r$ will be close to $x_k$, $y_k$ above referred to. Such addresses are generated for each pixel of the input video signals, in the sequence determined by the input raster. These transformed input addresses are used in filter co-efficient generator 26, to control the degree of filtering carried out by the adaptive filters 7 and 8.

Figure 3:
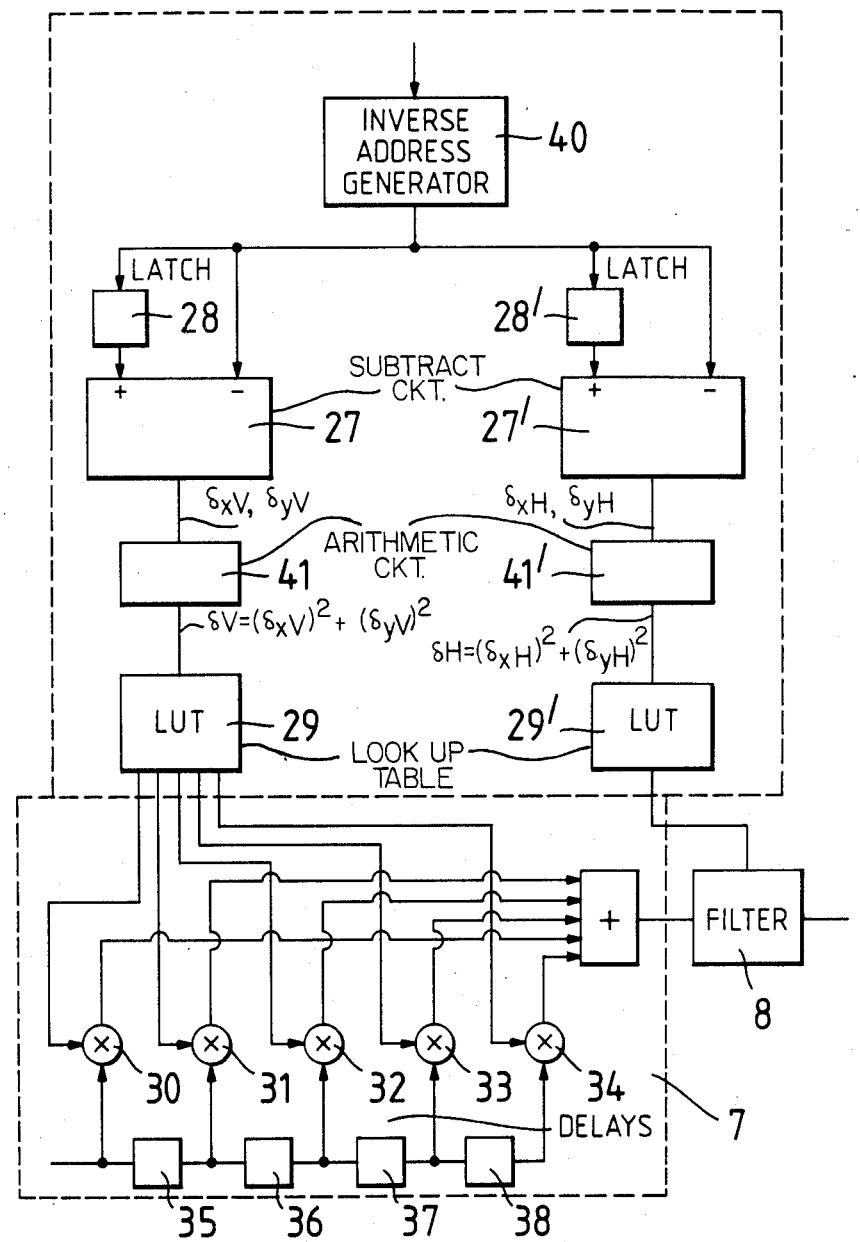
FIG. 3 illustrates, in more detail, the adaptive filter means incorporated in the system illustrated in FIG. 2.

Referring now to FIG. 3, the inverse address generator in the filter co-efficient generator 26 is represented at 40. The filter co-efficient generator also comprises two subtracting circuits 27 and 27' for the transformed components of each input pixel address as viewed on the output raster.

The respective x and y components of successive addresses of vertically adjacent input pixels, as viewed on the output raster are applied to a subtracting circuit 27 both directly and via a latch 28 which produces a delay of one line period. The subtracting circuit subtracts the respective components of the two addresses applied to 27 at any one pixel period to produce the differences $\delta x_v$ and $\delta y_v$. Similarly the respective components of successive addresses of horizontally adjacent input pixels, as viewed on the output raster are applied to the subtracting circuit 27', both directly and via a latch 28' which produces a delay of one pixel period. The subtracting circuit subtracts the respective components of the two addresses applied to 27' and any one pixel period to produce the differences $\delta x_H$ and $\delta y_H$. The two differences $\delta x_v$ and $\delta y_v$ are applied to an arithmetic circuit 41 which calculates a vertical address difference represented by:

$$\delta V = (\delta x_v)^2 + (\delta y_v)^2$$

Similarly the two differences $\delta x_H$ and $\delta y_H$ are applied to a second arithmetic circuit 41' which calculates a horizontal address difference represented by:

$$\delta H = (\delta x_H)^2 + (\delta y_H)^2$$

Figure 4:
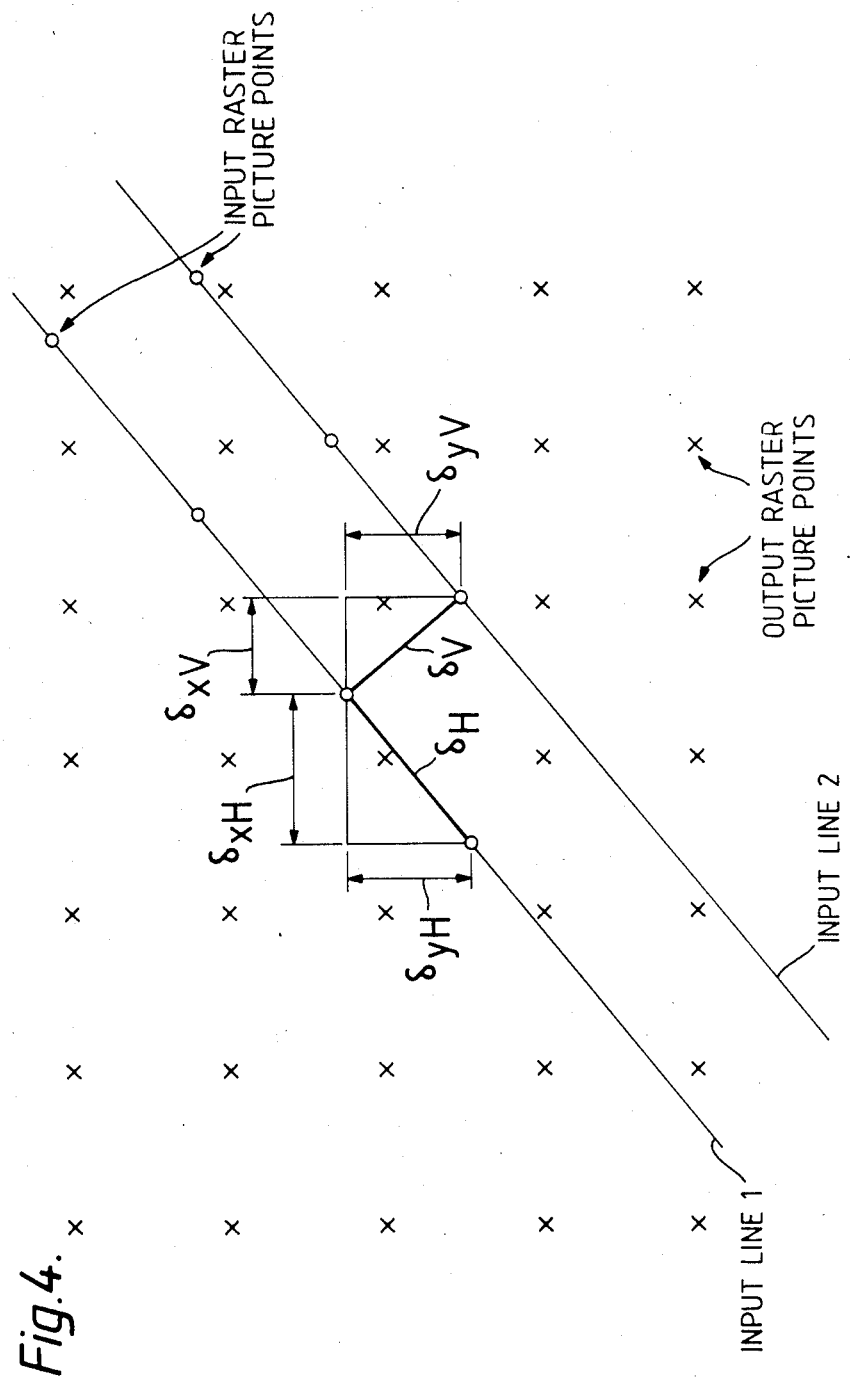
FIG. 4 is an explanatory diagram.

The differences $\delta v$ and $\delta H$ which are represented in FIG. 4 are applied to two look up tables 29 and 29'. the look up table 29 is arranged to deliver filter co-efficients to the vertical filter 7. This filter, as shown in FIG. 3, comprises a sequence of digital multipliers 30 to 34 to which the luminance signal stream is applied via a sequence of delay latches 35 to 38, each imparting a one line delay to the luminance pixels. The co-efficients delivered to the filter from the look up table 29 are applied as multipliers to the multiplying circuits 30 to 34 and the products of the multiplications (occurring at any one time) are added together in an adding circuit 39 to form the output of the filter. It will be understood that by a suitable choice of the filter co-efficients different filter characteristics can be simulated to selectively reduce the vertical resolution of the input pixels. If at a given time the effect produced by the system does not include compression of the image, or if the compression factor is less than some chosen threshold the output signal from the differencing circuit 27 exceeds a given threshold and the look up table 29 is so arranged that, in this situation, the filter co-efficient applied to the multiplying circuit 32 is unity and the co-efficients applied to the other multiplying circuits are zero. As a result the luminance pixels are passed through the filter without reduction in resolution. If, on the other hand, the difference signal is below the compression threshold value, the filter co-efficients read from the look up table are selected to conform to filter characteristic having a maximum in the middle position at the multiplier 32, and being non-zero to either side, so that the resolution of the luminance pixels is reduced. This filter characteristic is moreover adaptive, that is to say responsive to the value of the difference signal, in such a way as to reduce the resolution progressively (dependent on the choice of filter co-efficients selected from the look up table 29) as the compression of the image represented by the output signals increases, so as to substantially avoid the undesirable disturbance of the compressed image.

In a similar manner, the look up table 29', stores sets of pre-determined filter co-efficients for application to the horizontal filter 8 in response to the signal $\delta H$. This filter is of a similar construction to the vertical filter 7 except that, in this case, the delays equivalent to 35 to 38 are of one pixel period only. The filter 8 is adaptive in a similar manner to the filter 7, and it adapts the horizontal resolution of the luminance pixels to compression produced subsequently in the system. In the case of the filter 8, the input addresses to the co-efficient generator are aligned with the central outputs of the vertical filter. However, a delay of several pixels is required to correspond to the delay to the central input of the horizontal filter.

It will be understood that the construction illustrated for the filters 7 and 8 is merely one practical form of digital filter and other suitable filters may be employed. The number of multipliers such as 30 to 34 may also be varied depending on the maximum degree of filtering which may be required.

Numerous modifications may be made in the system described. For example, the horizontal and vertical differences $\delta H$ and $\delta v$ can be approximated by directly summing $\delta x_H$ and $\delta y_H$ in the one case and $\delta x_v$ and $\delta y_v$ in the other. It may not be necessary to transform the address of every luminance pixel in the input video signals into the co-ordinate system associated with the output raster. It may for example to sufficient to transform only every eighth pixel in every eighth line, appropriate changes being made in the delay of 28 and 28'. The adaptive filters 7 and 8 would be responsive to changes in the compression on a relatively coarse scale, compared with the arrangement described. A key signal may be transmitted along with the luminance pixels and itself filtered according to the compression of the image. In this case, the output signals from the interpolators 23 and 24 may be passed to respective combining circuits to which are also applied luminance, key and chrominance signals from another system similar to that described. The combiner is arranged to select the luminance and chrominance signals from one or other system depending on the relationship of the key signals at any particular time, and to produce a composite signal from the selected signals.

Furthermore, additional filter stores may be inserted in the system, before the adaptive filters 7 and 8 or after the interpolators 23 and 24.

We claim:

1. A video signal processing system comprising:
   storage means;
   means for writing pixels of input video signals of an input raster, representing an input image, in respective addresses of said storage means;
   means for reading pixels from said storage means in a different sequence to produce output video signals representing the same image as the input video signals but with at least a change in magnification, to thereby produce output video signals of an output raster representing an output image, said reading means including means for transforming addresses in the output raster to addresses in the input raster which are used for reading pixels from said storage means;

second transforming means for transforming addresses in the input raster to addresses in the output raster;

means for determining the separation of successive addresses in the input raster when transformed to addresses in the output raster to determine the degree of compression of the input image used in producing the output image;

and filter means dependent on the degree of compression to filter the video signals of the input raster prior to reading from said storage means to produce said output video signals.

2. A system as in claim 1 wherein said filter means includes means to allow a chrominance part of the video signals to pass through without the filter acting on it.

3. A video signal processing system as in claim 1 wherein:

said filter means includes coefficient generating means operating in response to said determining means; and said determining means includes means for producing a signal representing the horizontal difference and a signal representing the vertical difference between pixel addresses in the input raster when transformed to addresses in the output raster.

4. A video signal processing system as in claim 1 wherein said horizontal and vertical differences are between adjacent addresses in the input raster when transformed to addresses in the output raster.

5. A system as in claim 1 further comprising means, operative when said degree of compression is less than a selected threshold, to disable said filter means.

6. A video signal processing system as in claim 1 including a source of a keying signal associated with the input picture and wherein said filter means include means to filter said keying signal.

7. A system as in claim 1 wherein said filter means acts on the video signals prior to writing in the frame store.

8. A system for manipulating video pictures comprising:

a source providing an input picture which is in the form of an input raster of a succession of lines each comprising a succession of pixels which comprise video signals representative of respective elemental areas of the input picture;

a frame store having addressable storage locations for pixels;

a write address generator for addressing the storage locations in the frame store in a sequence corresponding to the input raster to thereby store the pixels of the input picture in the frame store;

a read address generator for addressing the storage locations in the frame store to read the stored pixels in a sequence corresponding to an output picture which is a manipulated version of the input picture that may include compression which varies in degree over the picture and is in the form of an output raster of a succession of lines each comprising a succession of pixels which comprise video signals representative of respective elemental areas of the output picture;

an interpolator responsive to pixels read out from the frame store to interpolate pixels of the output picture from pixels of the input picture which are positionally related to a projection of the output pixels onto the input raster; and an adaptive filter which filters the pixels of the input picture in accordance with the degree of compression of the input picture in order to arrive at the output picture, as determined on the basis of the spacing between pixels in the input raster in a projection thereof onto the output raster.

9. A system as in claim 8 in which the video signals comprise luminance and chrominance signals and the adaptive filter acts on the luminance but not on the chrominance signals.

10. A system as in claim 9 including a disabler which disables the adaptive filter when the degree of compression is less than a selected threshold.

11. A system as in claim 10 in which the filter means acts on the pixels of the input picture prior to the storage thereof in the frame store.

12. A system as in claim 11 including a source of a key signal for the input picture and wherein the adaptive filter comprises a filter for the key signal which filters it in accordance with said degree of compression.

13. A system as in claim 11 in which the filter filters the pixels of the input picture to cause a decrease of resolution of the input picture with increase in compression of the output picture.

14. A system as in claim 13 in which the decrease of resolution of the input picture varies with position in the input picture in accordance with variations in the degree of compression with position in the output picture.

15. A method of manipulating video pictures comprising:

providing an input picture which is in the form of an input raster of pixels which comprise video signals representative of respective elemental areas of the input picture;

storing the pixels of the input picture in a sequence corresponding to the input raster;

reading the stored pixels in a sequence corresponding to an output picture which is a manipulated version of the input picture that may include compression which varies in degree over the picture and is in the form of an output raster of pixels which comprise video signals representative of respective elemental areas of the output picture;

interpolating pixels of the output picture from read out pixels of the input picture which are positionally related to a projection of the output pixels onto the input raster; and adaptively filtering the pixels of the input picture in accordance with the degree of compression of the input picture in order to arrive at the output picture, as determined on the basis of spacing between pixels in the input raster in a projection thereof onto the output raster.

16. A method as in claim 15 in which the video signals comprise luminance and chrominance signals and the luminance but not the chrominance signals are filtered in said step of adaptively filtering.

17. A method as in claim 15 including omitting the step of adaptively filtering when the degree of compression is less than a selected threshold.

18. A method as in claim 15 including providing a key signal for the input picture and adaptively filtering the key signal in accordance with said degree of compression.

19. A method as in claim 15 in which the step of adaptively filtering causes a decrease of resolution of the input picture with increase in compression of the output picture, wherein said decrease of resolution can vary with position in the input picture.

* * * * *